(12) United States Patent
Pinkerton et al.

(10) Patent No.: US 9,231,942 B1
(45) Date of Patent: Jan. 5, 2016

(54) AUTHENTICATION BASED ON PATH INDICATOR FROM A SERVER

(71) Applicant: Google Inc., Mountain View, CA (US)

(72) Inventors: Michael David Pinkerton, Ashburn, VA (US); Naveen Agarwal, Fremont, CA (US)

(73) Assignee: GOOGLE INC., Mountain View, CA (US)

( * ) Notice: Subject to any disclaimer, the term of this patent is extended or adjusted under 35 U.S.C. 154(b) by 155 days.

(21) Appl. No.: 14/058,151

(22) Filed: Oct. 18, 2013

(51) Int. Cl.
*H04L 29/06* (2006.01)

(52) U.S. Cl.
CPC .......... *H04L 63/083* (2013.01); *H04L 63/0815* (2013.01); *H04L 63/0884* (2013.01); *H04L 63/107* (2013.01); *H04L 63/108* (2013.01); *H04L 63/20* (2013.01)

(58) Field of Classification Search
CPC . H04L 63/08; H04L 63/0807; H04L 63/0815; H04L 63/083; H04L 63/0876; H04L 63/0884; H04L 63/0892; H04L 63/10; H04L 63/107; H04L 63/108; H04L 63/20
See application file for complete search history.

(56) References Cited

U.S. PATENT DOCUMENTS

| | | | |
|---|---|---|---|
| 7,721,326 B2 * | 5/2010 | Bauban | H04L 63/08 713/176 |
| 8,010,783 B1 * | 8/2011 | Cahill | 713/155 |
| 8,536,976 B2 * | 9/2013 | Headley et al. | 340/5.2 |
| 8,627,410 B2 * | 1/2014 | Hughes et al. | 726/3 |
| 8,646,060 B1 * | 2/2014 | Ben Ayed | 726/9 |
| 9,032,498 B1 * | 5/2015 | Ben Ayed | H04W 12/06 726/9 |
| 2007/0156592 A1 * | 7/2007 | Henderson | 705/51 |

* cited by examiner

*Primary Examiner* — Zachary A Davis
(74) *Attorney, Agent, or Firm* — McDermott Will & Emery LLP (57) ABSTRACT

Systems, methods, and machine-readable media for selecting an authentication process are disclosed. A system is configured to determine whether a user account on a client device is to be authenticated. If the user account is to be authenticated, the system is configured to transmit a request for a path indicator to an authentication path server. The request includes a user account identifier corresponding to the user account. The authentication path server is configured to select the path indicator based on the user account identifier. The system is further configured to receive the path indicator from the authentication path server, select an authentication process based on the path indicator, and initiate the selected authentication process.

20 Claims, 5 Drawing Sheets

Request

User Account ID:

Token Exists:

Timestamp:

Application:

IP Address:

Location:

Current Network:

Visible Wi-Fi Networks:

FIG. 5

AUTHENTICATION BASED ON PATH INDICATOR FROM A SERVER

BACKGROUND

The present disclosure generally relates to user account authentication and, in particular, to selecting an authentication process.

Client devices (e.g., a mobile phone, tablet, or desktop computer) are configured to store tokens that allow users or user accounts to be authenticated by a service without the user having to provide login credentials. More specifically, the client device may transmit a token corresponding to a particular service to an identity server for that service. The identity server uses the token to determine whether the user is authenticated and, if the user is authenticated, allows the user access to resources or service provided by the service. In some cases, several tokens may be stored on a client device. Furthermore, one token may be used to authenticate several user accounts or be used to authorize one user account for several services.

However, some tokens that are used for one or more user accounts do not expire. Accordingly, anyone with possession of a user's device may use the tokens to authenticate the user's accounts and access services or resources that are reserved to the user. For example, if a user's mobile device is lost or stolen, anybody picking up the mobile device can be authenticated as the user to an email service and access the user's email. Other sensitive information or services may similarly be accessed.

SUMMARY

According to one aspect of the subject technology, a system for selecting an authentication process is provided. The system includes one or more processors and a machine-readable medium comprising instructions stored therein, which when executed by the one or more processors, cause the one or more processors to perform operations. The operations include transmitting a request for a path indicator to an authentication path server. The request includes a user account identifier corresponding to a user account to be authenticated. The operations also include receiving the path indicator from the authentication path server, wherein the authentication path server is configured to select the path indicator based on the user account identifier; determining an authentication process based on the path indicator; and initiating the authentication process.

According to another aspect of the subject technology, a method for selecting an authentication process is provided. The method includes determining whether a user account on a client device is to be authenticated; transmitting a request for a path indicator to an authentication path server, the request comprising a user account identifier corresponding to the user account; receiving the path indicator from the authentication path server, wherein the authentication path server is configured to select the path indicator based on the user account identifier; selecting an authentication process based on the path indicator; and initiating the selected authentication process.

According to yet another aspect of the subject technology, a machine-readable medium including instructions stored therein, which when executed by a machine, cause the machine to perform operations for selecting an authentication process, is provided. The operations include transmitting a request for a path indicator to an authentication path server, the request comprising contextual information; receiving the path indicator from the authentication path server, wherein the authentication path server is configured to select the path indicator based on the contextual information; selecting an authentication process based on the path indicator received from the authentication path server; and initiating the selected authentication process.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various aspects of the subject technology relate to systems and methods for providing authentication security. For example, to authenticate a user account, a user on a client device may contact a service that authenticates the user account, and the user may provide the service with authorization, or login credentials. The service may check the login credentials with login credentials for the user account stored by the service and, if the credentials match, the service may generate an authentication token and transmit the authentication token to the client device for storage. In subsequent communications between the client device and the service (or other services that use the same authentication token) where authentication of the user account is needed, the client device may send the authentication token to the service and the service may authenticate the user account based on the authentication token instead of having the user enter and submit login credentials again.

Some authentication tokens, however, may be valid indefinitely in that they do not automatically expire after a certain period of time. Accordingly, anyone with possession of a user's device may use any live authentication tokens to authenticate the user's accounts and access services or resources that are reserved to the user. For example, if a user's mobile device is lost or stolen, anybody picking up the mobile device can be authenticated as the user to an email service and access the user's email. Other sensitive information or services may similarly be accessed. Other authentication tokens that have expiration dates may not expire before the security of the user's device is compromised. These tokens and any other unexpired tokens may have similar security concerns.

According to various aspects of the subject technology, an authentication path server may provide additional authentication security by advising a client device on which authentication path to take using a path indicator. When a user account is to be authenticated, before an application on a client device sends a locally stored additional token corresponding to the user account to the identity server, the application may transmit a request for a path indicator to an authentication path server.

As will be described in further detail below, the authentication path server may determine a path indicator based on various signals associated with the user account and transmit the path indicator to the client device. Once the client device receives the path indicator, the client device can use the path indicator to determine the mechanism that will be used to authenticate the user account. According to some aspects of the subject technology, the client device may be configured to proceed with one authentication mechanism out of a number of possible authentication mechanisms based on the path indicator received from the authentication path server. The possible authentication mechanisms may have different security features and/or differing levels of security.

Figure 1:
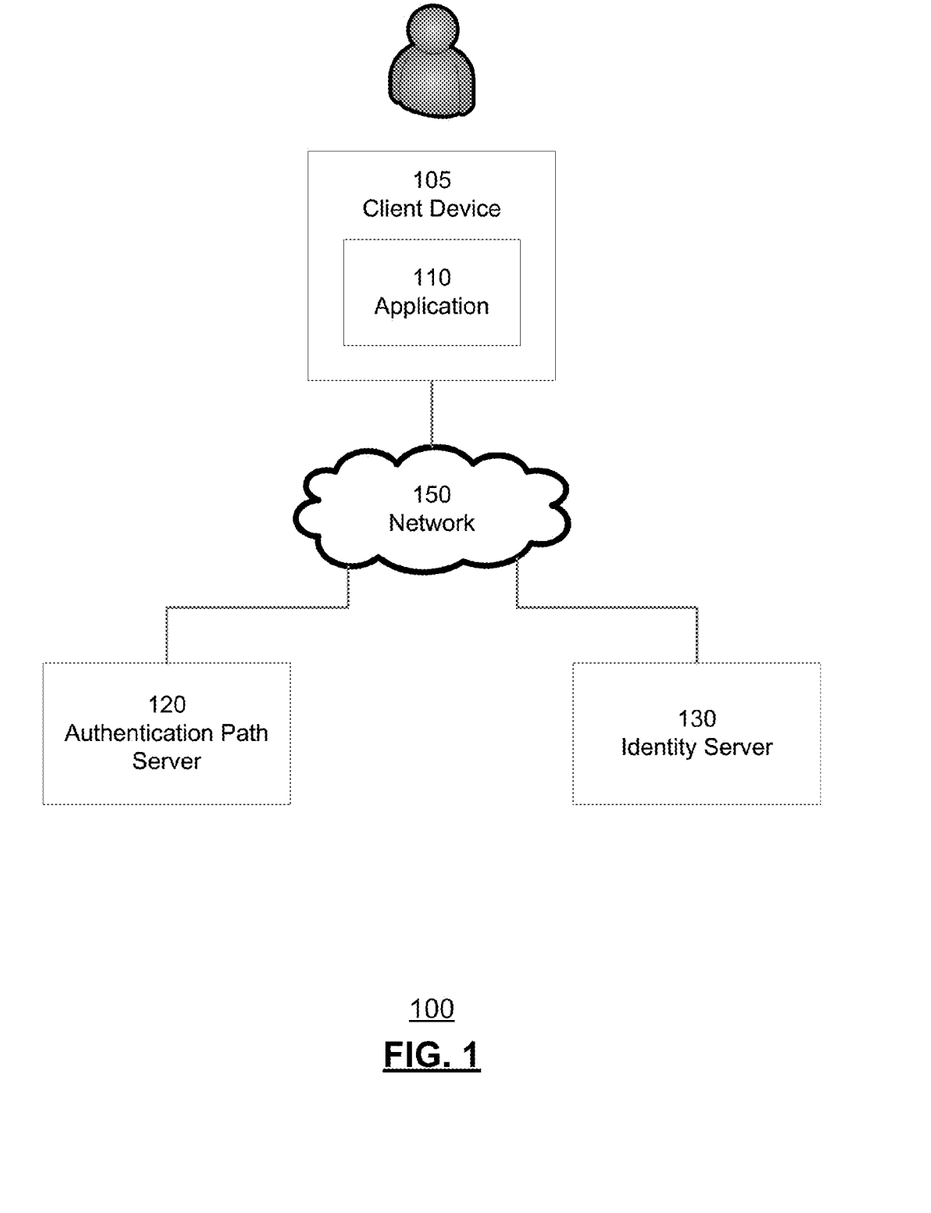
FIG. 1 is a conceptual block diagram illustrating an example environment for providing authentication security, in accordance with various aspects of the subject technology.

FIG. 1 is a conceptual block diagram illustrating an example environment 100 for providing authentication security, in accordance with various aspects of the subject technology. Although FIG. 1 illustrates a client-server network environment 100, other aspects of the subject technology may include other configurations including, for example, peer-to-peer environments. The network environment includes one or more client devices 105 that are in communication with at least one authentication path server 120 and at least one identity server 130 via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, a tree or hierarchical network, and the like.

The client device 105 may be any machine capable of communicating with the servers 120 and 130 via the network 150. For example, client device 105 may be a desktop computer, a laptop, a mobile device (e.g., a smart phone, tablet, personal digital assistant (PDA), a global positioning system (GPS) device, etc.), a set top box or smart display, or any other machine with a processor, memory, and communications capabilities.

Each client device 105 may also include one or more applications (e.g., application 110) that may be configured to perform tasks or provide services to the user. The applications may be used in conjunction with a variety of services provided over the network such as cloud computing services, email services, file hosting services, social networking services, etc. In some cases, a user account belonging to the user is to be authenticated before certain services are provided. Accordingly, the application 110 running on the client device 105 may be configured to transmit a request for a path indicator to an authentication path server 120.

As will be discussed in further detail below, the authentication path server 120 is configured to determine a path indicator for the user based on the request and transmit the path indicator back to the application on the client device. Although the authentication path server 120 in FIG. 1 is shown to be a single entity (e.g., a single computing machine), the authentication path server 120 may also be implemented as a cluster of machines configured as a single logical entity.

When the application 110 on the client device 105 receives the path indicator from the authentication path server 120, the application may select an authentication process based on the path indicator and initiate an authentication process for a user account. The authentication process may involve the application 110, other applications running on the client device 105, and/or the client device's 105 operating system authenticating the user account with the identity server 130.

According to some aspects of the subject technology, when the application 110 transmits the request for the path indicator, the application 110 may not yet know what user account is to be authenticated. For example, no authentication token for a user account that the application 110 may use may be stored on the client device 105. In other cases, tokens for more than one user account may be stored on the client device 105 and the application 110 may not know which token to use.

The authentication path server 120 may determine, based on information included in the request, which path the application 110 should use to specify a user account for authentication and to authenticate the specified user account. The request may include, for example, an application identifier for the application requesting authentication, an identifier for the client device 105 that the request is coming from, a timestamp, the IP address of the client device 105, location coordinates of the client device 105, or any other information that may be used by the authentication path server 120 to determine a path that an application 110 may use to authenticate one or more user accounts.

A path indicator corresponding to the determined path may be selected and transmitted back to the application 110, where the application 110 may proceed with the path indicated by the path indicator. One example path indicator may direct the application 110 to provide a user interface within the application 110 that prompts the user to enter user credentials (e.g., a user name or account name, password, PIN, biometric credentials, or a combination) corresponding to a user account or otherwise select a user account (e.g., from a drop down box). Another example path indicator may direct the application 110 to launch a web browser or other application on the client device 105 and have the web browser prompt the user for credentials. Still another example path indicator may direct the application 110 to launch the web browser or other application with instructions (e.g., a universal resource locator (URL) or other instructions) that allow for other authentication through other ways. For example, the web browser may load content (e.g., a web page or web application) retrieved from a web server corresponding to the URL that executes a particular authentication path. This path may be modified and changed over time based on what content is retrieved using the URL. According to another example, a path indicator may direct the application 110 to run some commands/code to detect if the user is a human or a bot.

Once a user account is authenticated using the path indicated by the path indicator, the application 110 may receive a token for the user account to store on the client device 105 for future use in authenticating the user account. For example, according to some aspects of the subject technology, the application 110 may determine that a valid token corresponding to a user account is stored on the client device 105. Accordingly, the request for the path indicator may include an indication that a token for the user account exists on the client device along with other information that may be used by the authentication path server 120 to determine a path that an application 110 may use to authenticate the user account.

Figure 2:
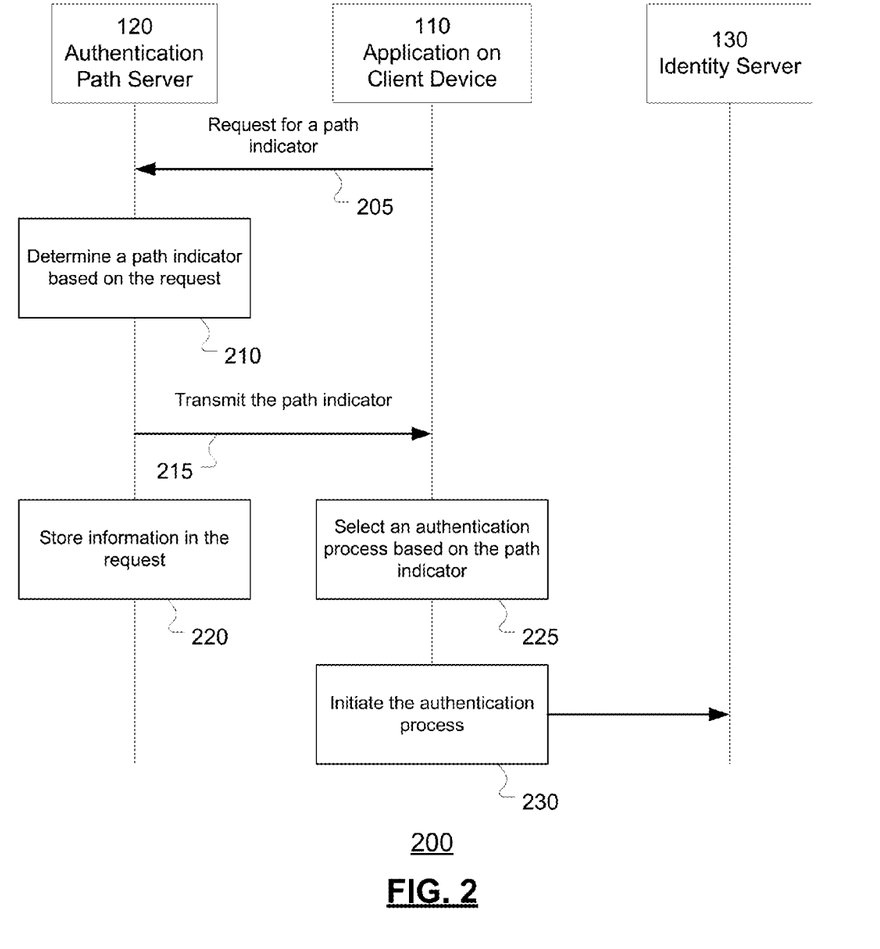
FIG. 2 is a communication diagram illustrating an example process providing authentication security, in accordance with various aspects of the subject technology.

FIG. 2 is a communication diagram illustrating an example process 200 providing authentication security, in accordance with various aspects of the subject technology. Although the operations in process 200 are shown in a particular order, certain operations may be performed in different orders or at the same time. The process 200 may begin when an application 110 running on the client device 105 attempts to authenticate a user account in order to provide services to a user. In order to authenticate the user account, at 205, the application 110 may transmit a request for a path indicator to the authentication path server 120. The request sent to the authentication path server 120 may include various pieces of information that may be used by the authentication path server 120 to select a path indicator.

Figure 3:
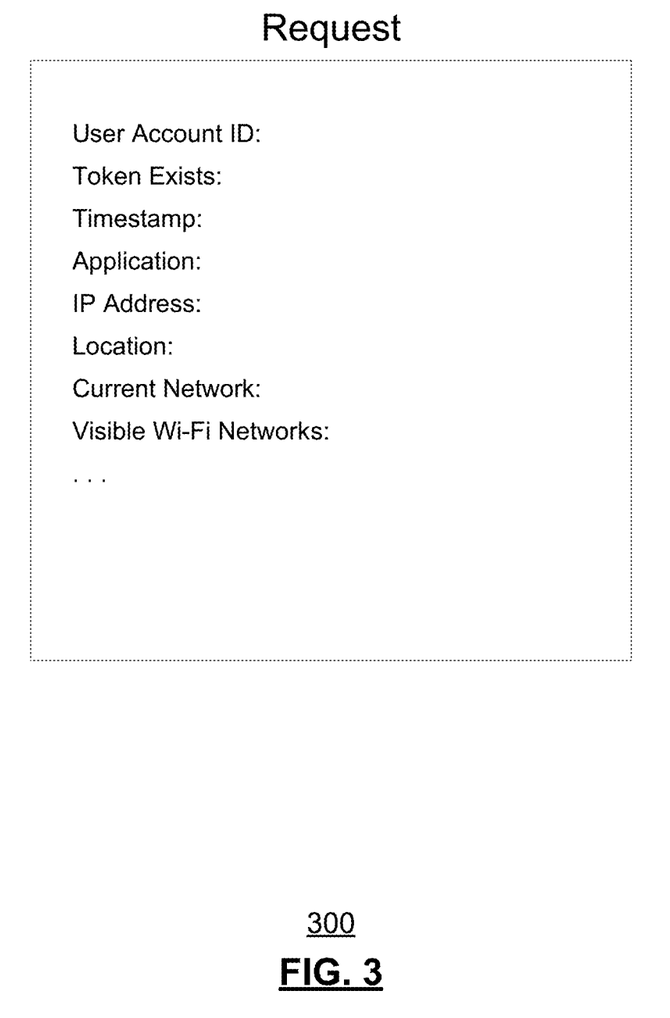
FIG. 3 is a diagram illustrating an example request for a path indicator, in accordance with various aspects of the subject technology.

FIG. 3 is a diagram 300 illustrating an example request for a path indicator, in accordance with various aspects of the subject technology. The information in the request may include, for example, a user account identifier corresponding to the user account, an indication as to whether or not a token for the user account exists on the client device, a timestamp, the application requesting authentication, and/or an identifier for the client device 105 that the request is coming from. The information may also include the current IP address of the client device 105, location coordinates of the client device, a network the client device is connected to, currently visible Wi-Fi or wireless networks, or any other information that may be used by the authentication path server 120 to determine which path indicator to transmit to the client device 105.

At 210 of FIG. 2, the authentication path server 120 determines a path indicator to send to the client device 110 based on the information contained in the request. According to some aspects, the authentication path server 120 may select a path indicator from a number of possible path indicators based on various conditions or scenarios being met. For example, one path indicator may be selected if the user account to be authenticated is a new account or no token for the user account exists on the client device 105. Another path indicator may be selected if an existing user account is to be authenticated, but it is the first time a particular application is requesting authentication of the user account.

According to other variations, the authentication path server 120 determines a path indicator based on additional or alternative factors relating to the likelihood that the user requesting authentication is the owner of the user account. For example, one path indicator may be selected if there is a high confidence that the user is the owner of the user account, for example, if the IP address in the request matches a previously received IP address, if a set of currently visible wireless networks corresponds to previously received sets of wireless networks, if the current location coordinates correspond to location coordinates associated with the owner, etc. Other path indicators may be selected if there is less confidence that the user is the owner of the user account.

According to other variations, the authentication path server 120 may determine a path indicator based on the geographic location of the client device 105 attempting to authenticate the user account. The geographic location of the client device 105 may be determined based on the IP address of the client device 105, the wireless networks that the client device 105 is connected to or can detect, or location coordinates of the client device 105. The authentication path server 120 may select path indicators for client devices differently depending on the location (e.g., countries or territories) of each client device 105.

After a path indicator has been determined, the authentication path server 120 transmits the path indicator to the client device 120 at 215. The authentication path server 120 at 220 may also store the information in the request in a database or other memory accessible to the authentication path server 120 to aid in determining a path indicator for subsequent requests.

Once the path indicator is received at the client device 105, at 225, the application 110 may select an authentication process based on the path indicator and initiate the authentication process for the user account at 230.

The application 110 may select one authentication process from a pre-defined number of possible authentication processes. Each of the possible authentication processes may involve different requirements, steps, or components. The different processes may correspond to different conditions or authentication scenarios for the user account. For example, some authentication processes may involve more security precautions than others. Some authentication processes may require more user interaction while other authentication processes may be automatic or require very little user interaction. Additionally, some authentication processes may require different information to be sent to the identity server 130 than other processes.

By authenticating a user account by using an authentication process selected based on a path indicator received from the authentication path server 120, the client device 105 allows the authentication of the user account to be customized based on determined conditions or scenarios. If, under certain conditions, additional security is needed, an authentication process that implements additional security checks may be used. If, on the other hand, additional security is not needed, an authentication process that implements fewer security checks may be used. Furthermore, the authentication of the user account may be changed or modified over time in order to carry out various experiments, to update authentication procedures, or to quickly and seamlessly alter authentication processes to address security or privacy issues.

According to some aspects, a predetermined number of possible path indicators, such as three possible path indicators, may be received from the authentication path server 120: a first or "default" path indicator, second or "embedded" path indicator, and third or "external" path indicator. As a result, the application 110 on the client device 105 may select from a predetermined number of possible authentication processes, such as three possible authentication processes, wherein each authentication process corresponds to one of the path indicators. For example, if the application 110 receives a default path indicator, the application 110 may transmit the locally stored token corresponding to the user account to the identity server 130 for authentication.

If the application receives an embedded path indicator, the application 110 may provide one or more security challenges to the user within the application interface. For example, the application 110 may prompt the user with a "Completely Automated Public Turing test to tell Computers and Humans Apart" (CAPTCHA) test or math problem to show that the user is human. The application 110 may also prompt the user for his username and password, for an answer to a security question, or for other credentials to ensure that the user is the owner of the user account. These credentials may be checked with a locally stored set of credentials or checked with the identity server 130.

If the user fails to provide the correct information, the application 110 may stop the authentication process and prevent the user from gaining further access to resources or services. If the user provides the correct information, the application 110 may transmit the locally stored token corresponding to the user account to the identity server 130 for authentication. In one implementation, the application 110 may also request, from the identity server 130, a new token for the user account. The new token may be stored locally at the client device 105 for future use in authorizing the user account.

If the application 110 receives an external path indicator, the application 110 may launch another separate application to continue the authentication process. For example, the application 110 may launch a web browser also on the client device 105 with a universal resource locator (URL). The web browser may load the content corresponding to the URL and perform additional authentication tasks such as the security challenges discussed above or other tasks that are not able to be completed within the application 110 that initiated the authentication process. Once the authentication tasks are successfully completed, the web browser may return control of the authentication process back to the application 110 that initiated the authentication process where the application 110 may transmit the locally stored token corresponding to the user account to the identity server 130 for authentication.

Figure 4:
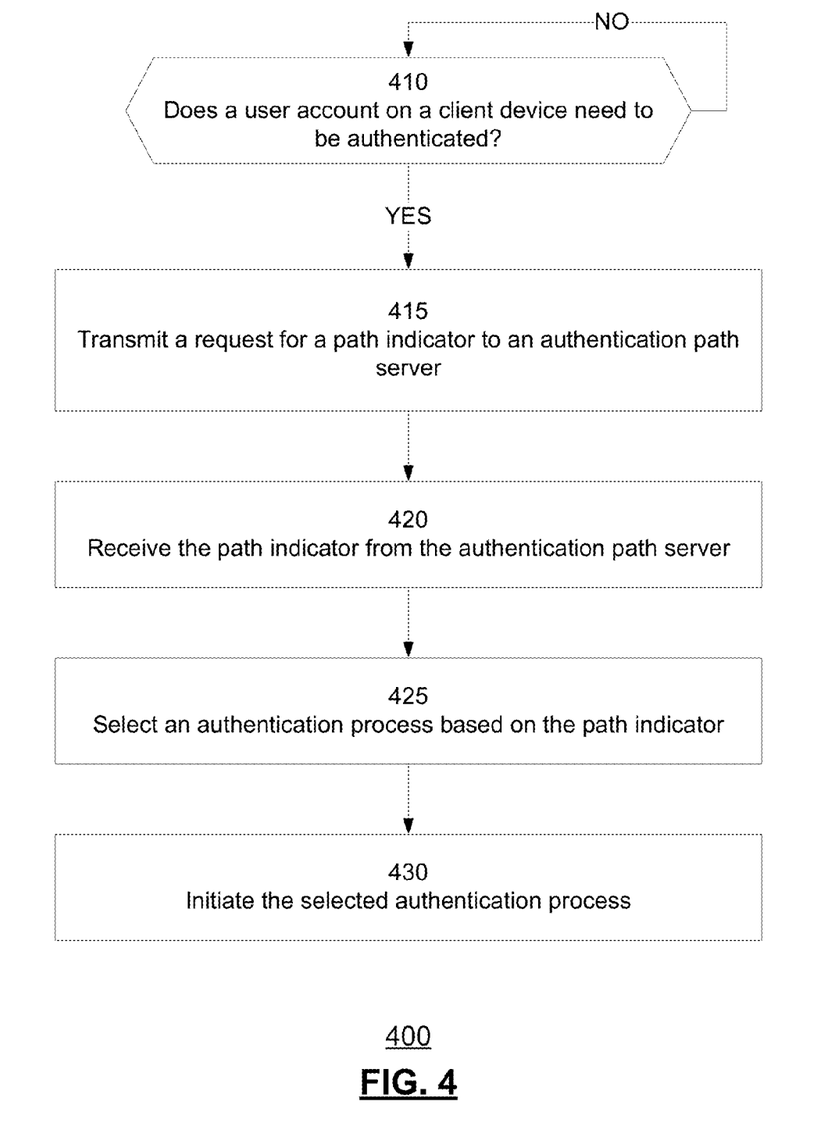
FIG. 4 is a flow chart illustrating an example process for selecting an authentication process, in accordance with various aspects of the subject technology.

FIG. 4 is a flow chart illustrating an example process 400 for selecting an authentication process, in accordance with various aspects of the subject technology. Although the operations in process 400 are shown in a particular order, certain operations may be performed in different orders or at the same time. At operation 410, an application 110 determines whether a user account on a client device 105 needs to be authenticated. For example, the application 110 may be configured to provide a user with certain services that use remote resources. In order to provide those services, a provider of the remote services (e.g., a server) may require that a user account associated with those services be authenticated. If no user account is to be authenticated, the application 110 may continue normal operation without transmitting a request for a path indicator.

If the application 110 determines that a user account needs to be authenticated, at operation 415, the application 110 transmits a request for a path indicator to an authentication path server 120. The request may include a user account identifier corresponding to the user account to be authenticated as well as other information that may be used by the authentication path server 120 to select a path indicator. According to some aspects, information contained in the request may be stored in a database in order to help the authentication path server 120 in selecting path indicators for future requests. Furthermore, the authentication path server 120 may access request information stored in the database and determine a path indicator for the received request based on the information from previously received requests associated with the same user account.

The information included in a request may include characteristics of the request such as an indication as to whether an authentication token for the user account associated with the request exists on the client device, a timestamp for the request, an application identifier for an application requesting authentication of the user account, and/or an identifier for the client device (e.g., a phone number, an email address, a hardware identifier, etc.). This information may be used by the authentication path server 120 to determine, for example, whether an authentication token for the user account can be used to authenticate the user account, whether another request associated with the same user account has been recently received, how often requests associated with the same user account are received, if previous requests associated with the same user account were received from the same device, etc. These determinations may be used by the authentication path server 120 to select a path indicator to transmit to the client device 105.

The information may also include contextual information such as a current IP address for the client device, location coordinates of the client device, a network identifier for the network that the client device is connected to, and/or a listing of visible wireless networks. This information may be used by the authentication path server 120 to determine, for example, whether a previous request associated with the user account has come from the same IP address, from within a threshold distance of location coordinates for one or more previous requests, or from a location where a least a threshold number of wireless networks are similar to those detected in one or more previous requests.

If one or more of these determinations can be made, the authentication path server 120 may determine that there is a higher degree of confidence that the authentication attempt is valid (e.g., from the owner of the user account). Accordingly, a path indicator for an authentication process with lower security may be selected and transmitted to the client device 105. If the determinations cannot be made, the authentication path server 120 may determine that there is a lower degree of confidence that the authentication attempt is from the owner of the user account. Accordingly, a path indicator for an authentication process with higher security may be selected and transmitted to the client device 105.

As discussed above, the authentication path server 120 is configured to select the path indicator based on the user account identifier and the other information in the request and transmit the path indicator to the client device 105. At operation 420, the application 110 on the client device 105 receives the path indicator from the authentication path server 110. The application 110 may select an authentication process based on the received path indicator at operation 425 and, at operation 430, initiate the selected authentication process.

Depending on the authentication process selected, initiating the authentication process may involve transmitting a locally stored authentication token corresponding to the user account to an identity server for authentication of the user account. As seen in FIG. 1, the identity server may be separate from the authentication path server. Initiating the selected authentication process may also, or alternatively, include prompting a user to respond to a security challenge, such as a CAPTCHA test, a math problem, a security question, or a request for login credentials. Initiating the selected authentication process may also, or alternatively, include launching a new application to continue the authentication process.

Although some aspects of the subject technology are described as having the application 110 on the client device 105 requesting a path indicator from the authentication path server 120, in some variations, before transmitting the request, the application 110 may first check to see whether an authentication token for the user account is stored on a memory accessible to the client device 105 before transmitting the request for the path indicator. If an authentication token is accessible to the client device 105, the application may request the path indicator from the authentication path server 120. The path indicator from the authentication path server 120 may provide the application 110 with guidance or instructions on an authentication process to use and whether or how to use the authentication token in authenticating the user account.

On the other hand, if there is no authentication token accessible to the client device 105 initially, the application 110 may authenticate the user account without requesting a path indicator from the authentication path server 120. For example, the application 110 may contact the identity server 130 and request authentication of the user account. The identity server 130 may request login credentials from the application before authenticating the user account. Accordingly, the application 110 may prompt the user to enter login credentials and pass the login credentials on to the identity server 130. The identity server 130 may check the login credentials with stored credentials and, if the credentials are valid, the identity server 130 may authenticate the user account, generate an authentication token for the user account, and transmit the authentication token to the application 110. The application 110 can store the authentication token for use in subsequent communications requiring authentication of the user account.

Alternatively, if there is no authentication token accessible to the client device 105 initially, the application 110 may also request a path indicator from the authentication path server 120. The path indicator from the authentication path server 120 may provide the application 110 with guidance or instructions on an authentication process to use and whether or how to specify a user account for authentication, authenticate the specified user account, and obtain an authentication token for the specified user account.

Figure 5:
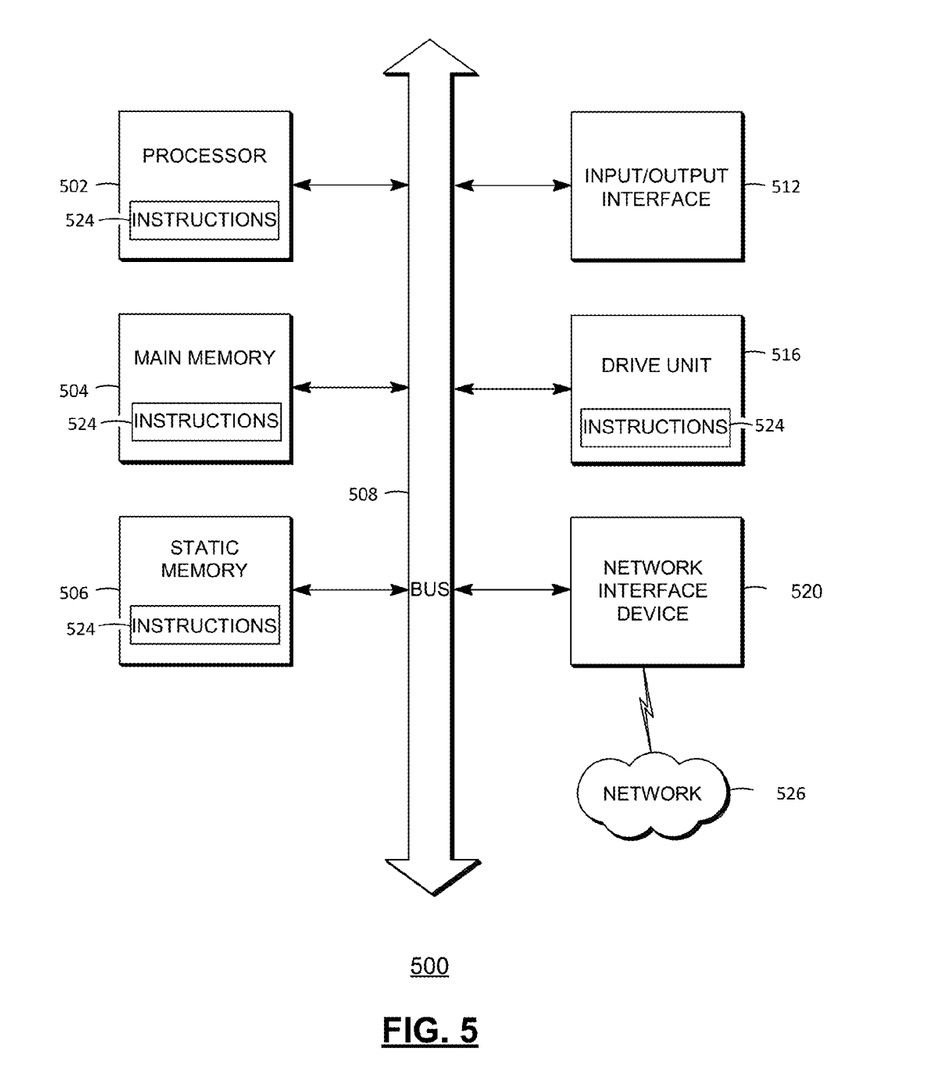
FIG. 5 is a block diagram illustrating a computer system with which any of the client devices and servers of FIG. 1 may be implemented, in accordance with various aspects of the subject technology.

FIG. 5 is a block diagram illustrating a computer system with which any of the clients and servers of FIG. 1 may be implemented, in accordance with various aspects of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal displays (LCDs), cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and one or more aspects may refer to an aspect. A phrase such as an "embodiment" does not imply that such embodiment is essential to the subject technology or that such embodiment applies to all configurations of the subject technology. A disclosure relating to an embodiment may apply to all configurations, or one or more configurations. An embodiment may provide one or more examples. A phrase such as an embodiment may refer to one or more embodiments and one or more embodiments may refer to an embodiment. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and one or more configurations may refer to a configuration.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method comprising:
   determining that a user account on a client device is to be authenticated;
   determining whether an authentication token for the user account is stored locally on the client device;
   transmitting a request for a path indicator to an authentication path server, the request comprising a user account identifier corresponding to the user account, the request indicating whether the authentication token is stored locally on the client device;
   receiving the path indicator from the authentication path server,
      wherein the path indicator comprises a first path indicator for transmitting the authentication token if the request indicates the authentication token is stored locally on the client device;
      wherein the path indicator comprises a second path indicator or a third path indicator if the request indicates no authentication token, the second path indicator corresponding to security challenges, the third path indicator corresponding to launching a new application;
   selecting an authentication process based on the path indicator; and
   performing the selected authentication process to authenticate the user account on the client device.

2. The computer-implemented method of claim 1, wherein the authentication process is selected from a predetermined number of possible authentication processes.

3. The computer-implemented method of claim 1, wherein the selected authentication process based on the first path indicator comprises transmitting the locally stored authentication token corresponding to the user account to an identity server for authentication of the user account.

4. The computer-implemented method of claim 3, wherein the authentication path server is separate from the identity server.

5. The computer-implemented method of claim 1, wherein performing the selected authentication process based on the second path indicator comprises prompting a user to respond to a security challenge.

6. The computer-implemented method of claim 5, wherein the security challenge is a "Completely Automated Public Turing test to tell Computers and Humans Apart" (CAPTCHA) test.

7. The computer-implemented method of claim 1, wherein performing the selected authentication process based on the third path indicator comprises launching the new application to continue the authentication process.

8. The computer-implemented method of claim 1,
   wherein the request for the path indicator is transmitted to the authentication path server if the authentication token for the user account is stored locally on the client device.

9. The computer-implemented method of claim 1, wherein the request further comprises at least one of a timestamp for the request, an application identifier for an application requesting authentication of the user account, and an identifier for the client device.

10. The computer-implemented method of claim 1, wherein the request further comprises at least one of a current IP address for the client device, location coordinates of the client device, a network identifier for a network the client device is connected to, and a listing of visible wireless networks.

11. The computer-implemented method of claim 1, wherein the authentication path server stores the request in a database.

12. The computer-implemented method of claim 11, wherein the authentication path server accesses previously stored requests in the database and determine a path indicator for the request based on previously received requests for path indicators associated with the user account.

13. A system comprising:
   one or more processors; and
   a machine readable medium comprising instructions stored therein, which, when executed by the one or more processors, cause the one or more processors to perform operations comprising:
      determining whether an authentication token for a user account to be authenticated is stored locally;
      transmitting a request for a path indicator to an authentication path server, the request comprising a user account identifier corresponding to the user account to be authenticated, the request indicating whether the authentication token is stored locally;
      receiving the path indicator from the authentication path server,
         wherein the path indicator comprises a first path indicator for transmitting the authentication token if the request indicates the authentication token is stored locally;
         wherein the path indicator comprises a second path indicator or a third path indicator if the request indicates no authentication token, the second path indicator corresponding to security challenges, the third path indicator corresponding to launching a new application;

selecting an authentication process based on the path indicator; and performing the selected authentication process to authenticate the user account.

14. The system of claim 13, where the selected authentication process based on the first path indicator comprises transmitting the locally stored authentication token corresponding to the user account to an identity server for authentication of the user account.

15. The system of claim 13, wherein performing the selected authentication process based on the second path indicator comprises prompting a user on a client device to respond to a security challenge.

16. The system of claim 13, wherein performing the selected authentication process based on the third path indicator comprises launching the new application on a client device to continue the authentication process.

17. The system of claim 13, wherein the request for the path indicator is transmitted to the authentication path server if the authentication token for the user account is stored locally.

18. A non-transitory machine-readable medium comprising instructions stored therein, which when executed by a machine, cause the machine to perform operations comprising:

transmitting a request for a path indicator to an authentication path server, the request comprising contextual information including an indication whether an authentication token for a user account to be authenticated is stored locally;

receiving the path indicator from the authentication path server, wherein the path indicator corresponds to transmitting the authentication token if the contextual information indicates the authentication token is stored locally;

wherein the path indicator corresponds to security challenges or launching a new application of the contextual information indicates no authentication token;

selecting an authentication process based on the path indicator received from the authentication path server; and performing the selected authentication process to authenticate the user account.

19. The non-transitory machine-readable medium of claim 18, wherein the authentication process is selected from a predetermined number of possible authentication processes.

20. The non-transitory machine-readable medium of claim 18, wherein the operations further comprise determining whether the authentication token for the user account is stored locally, wherein the request for the path indicator is transmitted to the authentication path server based on the determination.

* * * * *